(12) United States Patent
Grönberg et al.

(10) Patent No.: US 10,518,245 B2
(45) Date of Patent: Dec. 31, 2019

(54) PROCESS FOR THE HYDROTHERMAL TREATMENT OF HIGH MOLAR MASS BIOMATERIALS

(71) Applicant: Teknologian tutkimuskeskus VTT Oy, Espoo (FI)

(72) Inventors: Vidar Grönberg, Espoo (FI); Hanne Wikberg, Espoo (FI); Hans-Peter Hentze, Espoo (FI); Ali Harlin, Espoo (FI); Anna-Stiina Jääskeläinen, Espoo (FI)

(73) Assignee: Valmet Technologies Oy, Espoo (FI)

( * ) Notice: Subject to any disclaimer, the term of this patent is extended or adjusted under 35 U.S.C. 154(b) by 533 days.

(21) Appl. No.: 14/653,275

(22) PCT Filed: Dec. 18, 2013

(86) PCT No.: PCT/FI2013/051180
§ 371 (c)(1),
(2) Date: Jun. 18, 2015

(87) PCT Pub. No.: WO2014/096544
PCT Pub. Date: Jun. 26, 2014

(65) Prior Publication Data
US 2015/0321173 A1   Nov. 12, 2015

(30) Foreign Application Priority Data

Dec. 19, 2012   (FI) .................................. 20126330

(51) Int. Cl.
*B01J 21/18* (2006.01)
*C09C 1/48* (2006.01)

(52) U.S. Cl.
CPC ................. *B01J 21/18* (2013.01); *C09C 1/48* (2013.01)

(58) Field of Classification Search
None
See application file for complete search history.

(56) References Cited

U.S. PATENT DOCUMENTS

| | | | |
|---|---|---|---|
| 2010/0162619 A1 | 7/2010 | Peus | |
| 2011/0179703 A1* | 7/2011 | Gupta | ..................... C10G 1/02 44/621 |

FOREIGN PATENT DOCUMENTS

| | | |
|---|---|---|
| CN | 101948106 A | 1/2011 |
| CN | 102190909 A | 9/2011 |
| CN | 102583311 A | 7/2012 |

(Continued)

OTHER PUBLICATIONS

Kang et al: Solid fuel production by hydrothermal carbonization of black liquor. Biosource Technology, vol. 110, pp. 715-718, 2012.

(Continued)

*Primary Examiner* — Guinever S Gregorio
(74) *Attorney, Agent, or Firm* — Seppo Laine Oy

(57) ABSTRACT

The present invention concerns a process for the conversion of biomaterials into structural carbon products, particularly utilizing a hydrothermal treatment step that is carried out on a high molar mass organic starting material having a carbon content of >40 wt % of the dry matter. The invention also concerns a structural carbon product obtained using such a process, which has well-defined physico-chemical properties, e.g. in terms of surface area, carbon content, density, size and shape.

14 Claims, 1 Drawing Sheet

(56) References Cited

FOREIGN PATENT DOCUMENTS

| CN | 102587187 A | 7/2012 |
|---|---|---|
| CN | 102633249 A | 8/2012 |
| DE | 1020009015257 A1 | 10/2010 |
| EP | 2474591 A1 | 7/2012 |
| JP | 2007055625 | 3/2007 |
| JP | 2011178851 | 9/2011 |
| JP | 2011179703 A | 9/2011 |
| WO | WO 2008095589 A1 | 6/2008 |
| WO | WO 2009127727 A1 | 10/2009 |

OTHER PUBLICATIONS

Liu et al: Carbon Sphere/Activated Carbon Composite Materials Prepared by Solvothermal Method. JNL of Inorganic Materials, vol. 24, No. 6, Nov. 30, 2009.

Hu, J.J. et al: Enrichment and vacuum-sintering activity of colloidal carbon submicro-spheres, 2009.

Tekniikka Talous, Maailman huokoisimmassa aineessa on hehtaari pinta-alaa 2 grammaa kohti, Talentum Oyj, julkaisuaika Mar. 15, 2009.

Toor, S.S. et al. Hydrothermal liquefaction of biomass: a review of subcritical water technologies, Energy, May 2011, vol. 36, No. 5, pp. 2328-2342, 2011.

Xie, J.H. et al: Activated carbon as support of gold-platinum nanoparticles for the D-glucose electrochemical oxidation in alkaline solution, 2013.

Jönsson et al: Concentration and purification of lignin in hardwood kraft pulping liquor by ultrafiltration and nanofiltration. Chemical Engineering Research & Design, Part A, vol. 86, No. 11, Jan. 11, 2008, pp. 1271-1280, 2008.

Shiming et al: -Xylose, and Wood Meal. Industrial & Engineering Chemistry Research, vol. 51, No. 26, Apr. 7, 2012, pp. 9023-9031, 2012.

* cited by examiner

PROCESS FOR THE HYDROTHERMAL TREATMENT OF HIGH MOLAR MASS BIOMATERIALS

BACKGROUND OF THE INVENTION

Field of the Invention

The present invention concerns a process for the hydrothermal treatment of high molar mass biomaterials, which further have high carbon contents. In addition, the invention concerns the structural carbon products thus obtained, as well as the applications of these products.

Description of Related Art

Carbonization is the general term of the frequently used procedures for converting biomaterials into products of higher carbon content. These procedures can utilize heating, whereby it can be carried out as a type of pyrolysis. However, also water, and sometimes catalysts, can be applied.

Hydrothermal carbonization (HTC) is a technology involving the use of moderate heat and moderate pressure. The technology has been applied since the early 20$^{th}$ century. It is based on an exothermal reaction used to convert biomaterials into coal-containing products in the aqueous phase, utilizing moderately elevated temperatures and pressures, while producing minimal $CO_2$ emissions. Hydrothermal liquefaction (HTL) is a similar conversion process, which utilizes process conditions (temperatures and pressures) that are slightly harsher than in the HTC process.

Procedures of these types have been described in various publications in the past. JP 2011178851 discloses a process for the hydrothermal treatment of lignin at 300° C. to produce carbonized lignin, which can be used for electrical wires or cable jacketing. DE 102009015257, in turn, discloses a process for the hydrothermal carbonization of biomaterials of plant and animal origin (including wood chips) at a pressure of at least 5 bars and a temperature of up to 100° C., wherein the process conditions have improved in terms of heat and water supply.

Frequently, catalysts are also used, particularly to speed up the conversion, or to reduce the required temperature or pressure. WO 2008095589 A1 concerns a process for the hydrothermal carbonization of biomass at elevated pressure and preferably at a temperature of 140-240° C. using a catalyst, wherein the process conditions have been improved in terms of the time needed for the conversion. WO 2009127727 A1, in turn, concerns a two-step process for the hydrothermal carbonization of biomass, including any plant and animal-derived material, to obtain a coal-like material, wherein the first step is carried out at using heating, preferably to a temperature of 210-250° C., and the second step is carried out using a catalyst (a polymerization initiator) whereby the temperature can be lowered. In the publication, the process is said to be improved, among others, in terms of the time needed for the conversion and in terms of quality control.

Many types of biomasses, also those including lignin, have been subjected to HTC in the past. In fact, unlike other common processes, such as combustion, HTC allows the use of biomass raw materials with relatively high water contents, such as wood materials, including paper or board pulp as well as various plant-based waste materials. An article by Zhang, J., et al. (Journal of Chemical Technology and Biotechnology (2011), 86(9), 1177-1183) describes a method for producing spherical lignin and spheroidal microporous or mesoporous activated carbon from pulping black liquor. Similarly, Kang et al. (2012) concerns a process for the hydrothermal carbonization at 220-285° C. of black liquor having a crude lignin content of 30 wt % using formaldehyde as a polymerization agent to produce hydrochar with an improved yield and carbon recovery efficiency.

Thus, many attempts to improve such hydrothermal processes have been made in the past. Partly due to the fact that these procedures can be applied on biomasses with high water-contents, no reason has been found for separating the biomass into fractions. In fact, it has been considered advantageous to utilize all the carbon-containing waste-components of these available biomasses in the process to reduce the amount of further waste.

However, the present inventors have found that an improved yield and an improved efficiency can be obtained by utilizing only the high molar mass fractions of biomasses as the starting materials of the hydrothermal treatment.

The new procedure of the present invention has also been surprisingly found to result in an improved morphological control and better defined physico-chemical properties of the products (e.g. in terms of surface area, carbon content, density, size and shape).

SUMMARY OF THE INVENTION

It is an object of the present invention to provide an improved process for the conversion of biomaterials into pure carbon products.

Particularly, it is an object of the present invention to provide a process utilizing materials with high carbon contents as the starting materials in a hydrothermal treatment.

A further object is to provide carbon products with improved properties in terms of structure, especially in terms of surface area, carbon content, density, size and shape.

These and other objects, together with the advantages thereof over known processes and products, are achieved by the present invention, as hereinafter described and claimed.

Thus, the present invention concerns a process for the conversion of biomaterials into structural carbon products. More specifically, the process of the present invention is characterized by what is stated in the characterizing part of claim 1.

Further, the carbon product of the present invention is characterized by what is stated in the characterizing part of claim 17 and the use of the process is characterized by what is stated in claim 20.

Considerable advantages are obtained by means of the invention. Thus, the present invention provides a hydrothermal treatment utilizing only high molar mass fractions of biomaterials as starting materials. Using said process, higher carbon yields are obtained, as well as improved morphological control, while carbon dioxide emissions are maintained at a minimal level. In fact, with long reaction times, carbon dioxide emissions can be reduced to an insignificant level.

Further, the obtained products have better defined physico-chemical properties, e.g. in terms of surface area, carbon content, density, size and shape. The final structural carbon products can be used for example to reinforce rubber materials used in, e.g. tires, cables, insulations and plastics. The carbon also improves the heat resistance and conductivity of such materials.

Next, the invention will be described more closely with reference to the attached drawings and a detailed description.

DETAILED DESCRIPTION OF THE PREFERRED EMBODIMENTS OF THE INVENTION

Figure 1:
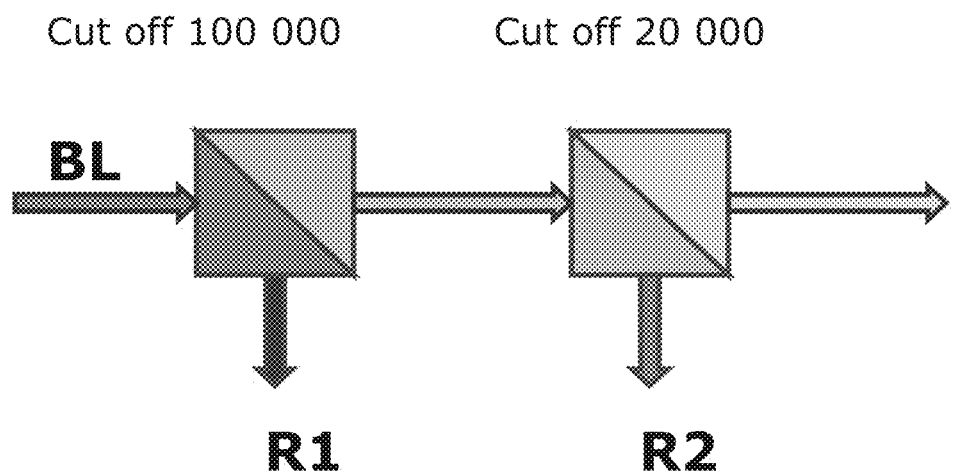
FIG. 1 is a schematic image of the fractionation of hardwood kraft black liquor lignin using two different membranes (GR40PP, cut off 100 000 and GR60PP, cut off 20 000).

The present invention concerns a process for the conversion of natural raw materials (biomaterials) into structural carbon products or their aggregates, which includes a pressurized hydrothermal treatment step of an organic starting material having a carbon content of >40 wt %, preferably up to 60 wt %, of the dry matter. Said starting material is preferably obtained from the raw material by extraction.

The term "structural" or "structural carbon products" is intended to cover materials consisting of porous particles with high surface areas, particularly >500 $m^2$/g, generally being also microporous or mesoporous, particularly having an average pore volume of <1 ml/g. Such particles can be obtained with the help of the morphological control of the present process.

The "carbon products" are generally intended to cover materials containing elemental carbon.

The starting materials are particularly selected from those including components having high carbon contents, such as carbohydrates, preferably cellulose, hemicellulose, lignin, tannins and betulin, preferably in particulate form, i.e. with particle sizes of <1 cm. Particularly these starting materials are selected from materials having high contents of lignin, hydrolysis lignin or lignan, preferably materials obtained from side-streams of the manufacture of paper, board, biofuel or brewery products, such as pulp obtained from a pulping factory, more preferably from chemical pulp, such as black liquor, or hydrolysis lignin obtained from the manufacture of $2^{nd}$ generation biofuels or lignan extracts from breweries.

In the present process liquid extracts, such as dilute chemical pulp, particularly black liquor, or brewing extracts, have been found most suitable for use as starting materials.

The natural raw materials either contain or consist of such starting materials. In case the raw materials are formed of larger solid structures (with particle sizes of ≥1 cm), such as wooden raw materials, preferably selected from bark, branches, needles and twigs, these generally require some processing, e.g. by grinding, to obtain the starting materials for use in the hydrothermal treatment step.

Optionally, the raw materials can be formed of processed materials such as dissolved or colloidal materials, or as pulp, for example in the form of black liquor, including among others water, which pulp can be further processed to separate the above mentioned starting materials from the excess water and further components, for example by precipitation, sieving or filtration, to provide a fraction containing the components having high carbon content for use as the starting materials of the hydrothermal treatment step, or the dissolved or colloidal materials, dissolved or dispersed for example in water or an alcohol, such as ethanol, or a mixture thereof, can be used as such, optionally after homogenization, to enable forming a carbon product having a larger content of nanostructured carbon and primary particles on a sub-micron scale.

It has been discovered that lignin in colloidal or at least partly soluble form is particularly suitable for use in the formation of nano-sized carbonized particles and in increasing the carbon content of the product. According to this embodiment, the lignin is applied in such colloidal or at least partly soluble form to the process in order to keep the lignin particle size small and to eliminate aggregation and agglomeration during the hydrothermal treatment step.

Without separation of the starting materials from such raw material mixtures, the process would be carried out on materials with high water contents and large particle sizes, which would decrease the efficiency of the process.

The above mentioned extraction can thus include steps for separating the above starting materials from the other components of the raw materials, or for further selecting starting materials having advantageous properties, such as a high molar mass. Particularly, ultrafiltration is carried out to obtain a concentrate having said high molar mass, and particularly a high carbon content. Ultrafiltration is particularly suitable for separating high molar mass lignin from kraft black liquor. This high molar mass fraction has a higher carbon content than the original black liquor and is highly useful as a starting material for hydrothermally produced carbon.

The process includes at least one step that is carried out at an elevated temperature, which preferably is ≥80° C., more preferably 100 to 600° C., most suitably 150 to 400° C. The process also includes at least one step that is carried out at an elevated pressure of >1 bar, preferably >10 bar. A step that is carried out at both an elevated temperature and an elevated pressure is the hydrothermal treatment. This hydrothermal treatment is preferably selected from hydrothermal carbonization (HTC) and hydrothermal liquefaction (HTL).

According to an embodiment of the invention, the hydrothermal treatment is hydrothermal carbonization (HTC), whereby a treatment temperature of 80 to 250° C. is preferred. More preferably, a treatment temperature of 100 to 250° C. is used, most suitably a temperature of 180 to 230° C. According to this embodiment, the process conditions are particularly selected to enable conversion of the starting materials into carbon black, which by definition is a porous (and structural) form of carbon. Particularly, this carbon black is optimized (in terms of structure, particle size and properties) for use as a pigment, an additive for rubber or plastic (particularly a UV stabilizer or a reinforcing agent), and an additive for cables or electrical equipment (particularly for adjusting antistatic or semiconductive properties).

According to another embodiment of the invention, the hydrothermal treatment is hydrothermal liquefaction (HTL), whereby a treatment temperature of ≥150° C. is preferred. More preferably, a treatment temperature of 150 to 600° C. is used, most suitably a temperature of 200 to 400° C. According to this embodiment, the process conditions are selected to enable conversion of the starting materials into active carbon, which by definition is a porous (and structural) form of carbon, having an even higher surface-area-to-volume ratio than carbon black. Particularly, this active carbon is optimized (in terms of structure, particle size and properties) for use as an adsorbent, a liquid purifying agent (in water or solvent purification) or a medicament.

Generally, the complete process is carried out during a time period of ≥1 h, preferably during 1 to 70 h. Particularly, the hydrothermal treatment step is carried out at an elevated temperature (and pressure), which temperature is maintained during a time period of >1 h, preferably from >1 h to 70 h, more preferably from 4 to 24 h.

The process can further include at least one step of grinding the reaction mixture to provide carbon particles having a rough surface, or according to another alternative a step of dissolving or dispersing the starting material, for example in water or an alcohol, as described above. In addition to grinding the above mentioned raw material to provide smaller particles of starting material, a grinding step can be used in a subsequent step of the process, for example to give smaller product particles.

The process will yield a product mixture, where the final structural carbon product is easily separated from the minor components, e.g. by dissolution and filtration, whereby the minor components generally will remain in solution.

Thus, the present invention also concerns a final structural carbon product obtained by a hydrothermal treatment of biological starting materials having high carbon contents, such as the materials described above. Further, said carbon product can optionally be obtained using the above described process.

The carbon products are preferably shaped as spheroidal carbon particles obtained from primary particles, such as aggregates, having an average particle size of <250 nm, particularly <100 nm. The carbon particles formed from these primary particles generally have a porous character, particularly being micro- or mesoporous, preferably having a BET surface area of >500 m$^2$/g, more preferably >1000 m$^2$/g, most suitably >1500 m$^2$/g.

As described above, according to an embodiment of the invention, the obtained product can be in the form of carbon black. Particularly, this carbon black is intended for use as a pigment, an additive for rubber or plastic (particularly as a UV stabilizer or a reinforcing agent), and an additive for cables, other electrical equipment or fuel cells (particularly for adjusting antistatic or semiconductive properties).

According to another embodiment of the invention, the obtained product can be in the form of active carbon. Particularly, this active carbon is intended for use as an adsorbent, a liquid purifying agent (in water or solvent purification) or a medicament.

The carbon products can have some catalytic activity themselves. However, optionally they contain nanoparticles of a separate catalyst or a mixture of catalysts, adsorbed or attached to the carbon surface (the precursor) to form a complex structure.

Such structures can be manufactured, e.g. by adding metal ions to carbohydrates. These carbohydrates have a sufficient reactivity to form complexes by adsorbing said metal ions. The ions can subsequently be reduced at the carbohydrate surface in aqueous suspensions under atmospheric conditions to generate metal nanoparticles, which will remain adsorbed to the carbohydrate surface. Finally, the carbohydrate particles can be converted into carbon using the above described hydrothermal treatment. Naturally, the carbohydrates can be obtained using the above described separation of high molar mass components (e.g. carbohydrates) from natural raw material mixtures.

Alternatively, such catalytic nanoparticles can be formed, for example by controlled nucleation and growth on the carbon precursor.

The catalyst(s) used or prepared for this purpose is/are preferably selected from the group of metal nanoparticles, preferably being particles of gold (Au), palladium (Pd), platinum (Pt) or ruthenium (Ru). The thus obtained complex carbon-catalyst structure is particularly useful in heterogeneous catalysis, for example in low energy chemical synthesis, water treatment, soil detoxification and emission reduction.

Commercial metal catalysts on carbon supports are obtained by infiltration of metal nanoparticles into porous carbon structures. However, the affinity is low. Using the above described process for adhering the catalyst nanoparticles to carbohydrates by binding, prior to conversion of the carbohydrate starting material into the structural carbon product, an increased affinity is obtained.

The following non-limiting examples are intended merely to illustrate the advantages obtained with the embodiments of the present invention.

EXAMPLES

Example 1—Separation of Kraft Black Liquor into Fractions

Kraft black liquor was subjected to ultrafiltration using different cut-off values to obtain fractions of varying molar mass. The contents of different components in said fractions were measured (see the following Table 1).

TABLE 1

| Ultrafiltration balances (in %) | | | | |
|---|---|---|---|---|
| | black liquor | cut-off: 100,000 | cut-off: 20,000 | cut-off: 5,000 | remaining fraction |
| Dry content | 18.0 | 30.7 | 17.1 | 11.9 | 10.6 |
| lignin | 32 | 55 | 53 | 31 | 24 |
| hemicellulose | 4 | 13.6 | 2.3 | 0.4 | 0.1 |
| ash | 45 | 27 | 44 | 47 | 76 |
| Σ (lig + hemi + ash) | 81.0 | 95.6 | 99.3 | 78.4 | 100.1 |
| carbon | 33 | 47 | 41 | 31 | 26 |

The high molar mass fractions were selected for subsequent treatment due to their high carbon contents.

Example 2—Production of Carbon from Lignin by HTC

Lignin has been found particularly suitable for use as a starting material in the present process, among others due to its high carbon content, but also due to the fact that lignin can be extracted in high yields, for example, from black liquor (see the above Table 1), where it forms a by-product. In some pulping processes, lignin separation is even required to increase pulp production.

In this example, pure lignin was extracted from kraft black liquor by $CO_2$ precipitation, and subjected to HTC at a treatment temperature of about 200° C. and a treatment pressure of about 20 bar. The product mixture (having a carbon content of about 80%) was subjected to dissolution with water, and filtration to obtain a pure dry carbon product.

The carbon content of the product was measured, and compared to the contents of untreated lignin, cellulose, hemicellulose and crude oil. The compositions of these biofractions (cellulose, hemicellulose, lignin, crude oil and the HTC product of lignin) are shown in the following Table 2.

TABLE 2

The composition of biofractions (in % of total)

|           | C    | H   | O    | N   | Ash |
|-----------|------|-----|------|-----|-----|
| Cellulose | 41.8 | 6.4 | 51.2 | 0.1 | 0.3 |
| Hemi      | 38.1 | 6   | 48.5 | 0.1 | 6.7 |
| Lignin    | 58.6 | 5.7 | 30.8 | 0.7 | 3.9 |
| CRO       | 85   | 12  | 1    | 1   | 0.1 |
| HTC(L)    | 78.2 |     | 20.3 |     |     |

An increased carbon content had clearly been obtained using the process of the present invention.

A further HTC product of lignin was prepared using a pH of 5-7, a temperature of 180-220° C., a dry content of 5-10%, including 3% of a catalyst (acetic acid), and a residence time of 4 h. The thus obtained product was analyzed (and the procedure was repeated 3 times to give experiments 1, 2 and 3) to give the results of the following Table 3, using carbon black from a pyrolysis process as a reference. The process conditions were selected to favor the formation of carbon and prevent the formation of oxygen.

TABLE 3

The composition of lignin, subjected to HTC (in wt-% of total)

|        | C     | O     | Na   | S    | Ca   |
|--------|-------|-------|------|------|------|
| Ref.   | 100.0 | —     | —    | —    | —    |
| Exp. 1 | 86.44 | 12.09 | 0.30 | 1.17 | —    |
| Exp. 2 | 77.31 | 21.60 | 0.54 | 0.55 | —    |
| Exp. 3 | 84.26 | 13.97 | 0.34 | 0.76 | 0.66 |

Example 3—Production of Nanosized Carbon Particles from Black Liquor Lignin Using HTC Black liquor lignin was fractionated to fractions with the cut off 100 000 (R1) and 20 000 (R2) according to Table 1, Example 1, as well as FIG. 1. R1 and R2 were further processed with HTC. We used following conditions: temperature 180-230° C., residence time 6 h, dry matter 1% and 5%, no additional catalyst, pH alkaline (corresponding to pH of black liquor). Kraft lignin was used as a reference material and it was precipitated from kraft black liquor according to Example 2.

Figure 2:
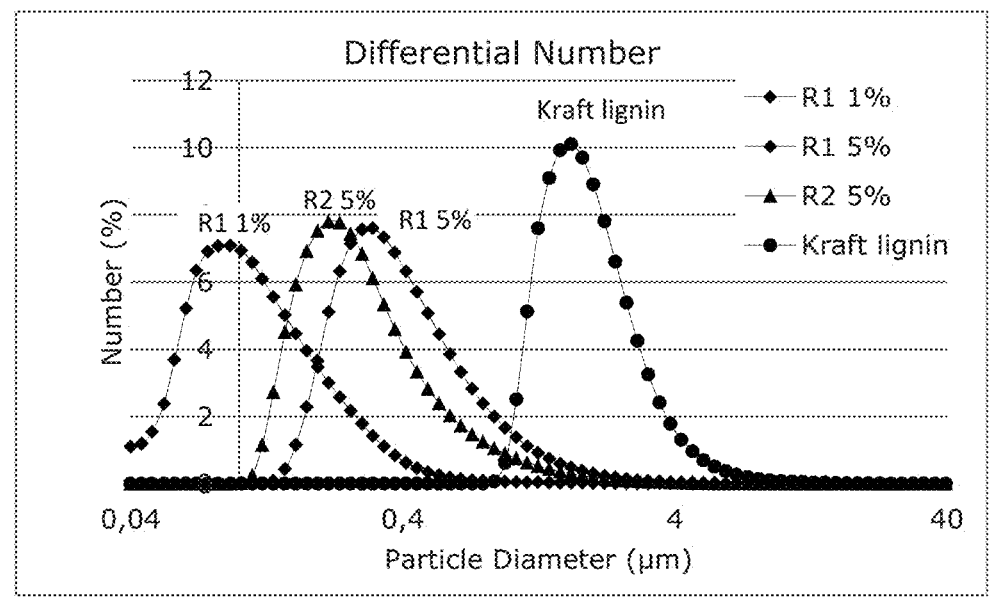
FIG. 2 is a graph showing the particle size as a differential number for kraft lignin and black liquor lignin fractions R1 and R2 after HTC.

The number average particle size distribution was determined for the obtained products and reference material to give the results of FIG. 2 and Table 4. According to the results, HTC can be used as a method to reduce the particle size of the original raw material and to produce nanosized carbon particles for example for carbon black applications.

TABLE 4

Mean particle size presented as differential number for kraft lignin (reference) and black liquor lignin fractions R1 and R2 after HTC.

| Sample      | Kraft lignin | R1 1% | R1 5% | R2 5% |
|-------------|--------------|-------|-------|-------|
| Mean value, μm | 2.0       | 0.12  | 0.42  | 0.31  |

The invention claimed is:

1. A process for the conversion of raw biomaterial into structural carbon products or their aggregates, comprising:
   prior to a pressurized hydrothermal treatment step, separating an organic starting material having a dry matter carbon content of >40 wt % from the raw biomaterial; and
   utilizing solely the organic starting material having a dry matter carbon content of >40 wt % from the separating step, subjecting the organic starting material to the pressurized hydrothermal treatment step to provide the structural carbon products or their aggregates, wherein the pressurized hydrothermal treatment step is done at a temperature of from 80 to 600° C. and at a pressure of >1 bar.

2. The process according to claim 1, wherein the starting material comprises a dry matter carbon content of from 40 wt % to 60 wt %.

3. The process according to claim 1, wherein the starting material is extracted from wooden raw materials.

4. The process according to claim 1, wherein the pressurized hydrothermal treatment step is carried out at a temperature of from 150 to 400° C.

5. The process according to claim 1, wherein the pressurized hydrothermal treatment step is carried out at a pressure of >10 bar.

6. The process according to claim 1, wherein the pressurized hydrothermal treatment step is done at a temperature of 80 to 250° C.

7. The process according to claim 1, wherein the pressurized hydrothermal treatment step converts the starting material into carbon black.

8. The process according to claim 1, wherein the pressurized hydrothermal treatment step is done at a temperature of 200° C. to 400° C.

9. The process according to claim 1, wherein the pressurized hydrothermal treatment step converts the starting material into active carbon.

10. The process according to claim 1, wherein the pressurized hydrothermal treatment step is carried out for a time period of ≥1 h.

11. The process according to claim 1, wherein the separating step provides a reaction mixture, and further comprising grinding the reaction mixture to provide carbon particles in the organic starting material having a structured surface.

12. The process according to claim 1, wherein the extracting comprises ultrafiltration of the raw biomaterial to obtain the organic starting material.

13. The process according to claim 1, wherein a catalyst or a mixture of catalysts is added to the structural carbon products or their aggregates, wherein the catalyst(s) is/are selected from the group of metal nanoparticles.

14. The process according to claim 1, wherein the separating comprises dissolving or dispersing the raw material into a solution to provide the organic starting material with a dry matter carbon content of >40 wt %.

\* \* \* \* \*